E. DUCHAMP.
Water Cooler.

No. 25,398.  Patented Sept. 13, 1859.

Witnesses:
Wm Tusch
R. S. Spencer

Inventor:
Eugene Duchamp

UNITED STATES PATENT OFFICE.

EUGÈNE DUCHAMP, OF ST. MARTINSVILLE, LOUISIANA.

FILTER.

Specification of Letters Patent No. 25,398, dated September 13, 1859.

*To all whom it may concern:*

Be it known that I, EUGÈNE DUCHAMP, of St. Martinsville, in the parish of St. Martins and State of Louisiana, have invented a new and useful Improvement in Filters and Water Coolers; and I do hereby declare that the following is a full, clear, and exact description thereof, reference being had to the accompanying drawings, and to the letters of reference marked thereon, in which—

Figure 1:
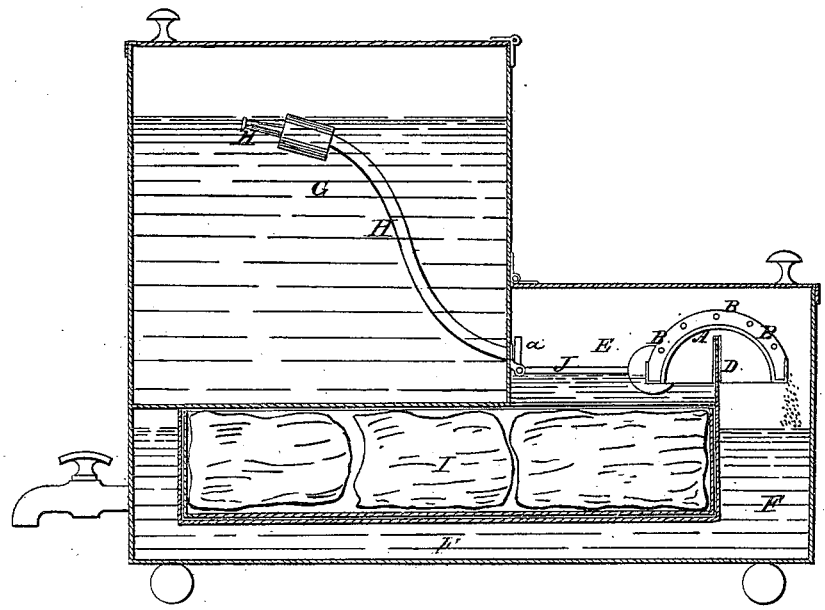
Figure 2:
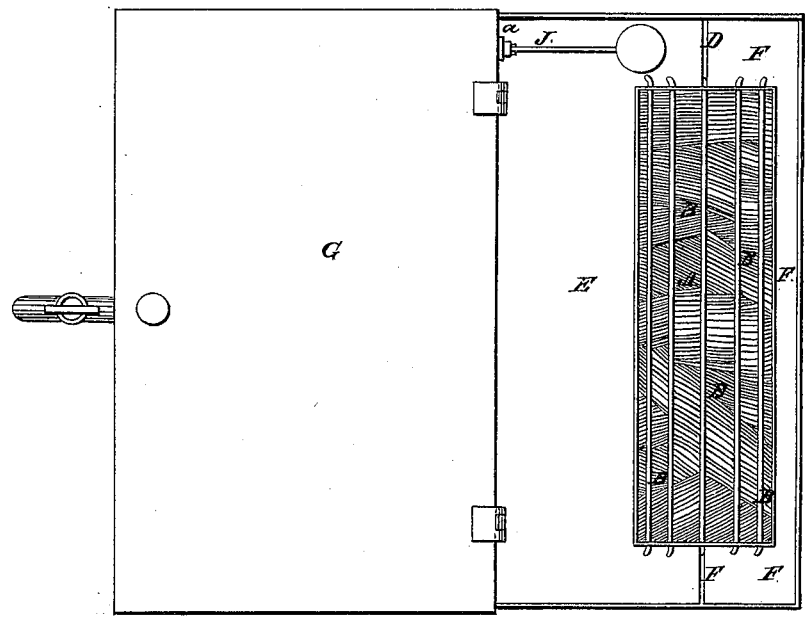

Figure 1 represents a longitudinal vertical section taken through the water receptacles, ice chest, and through the filter. Fig. 2 is a plan view of the chest showing clearly the construction of the filter.

My invention relates to the process of separating liquids from the substances suspended mechanically in them by passing them through materials sufficiently compact to retain the insoluble matters. The materials usually employed as filters are numerous; as porous stone, broken stone, ground glass, gravel, sand, straw, cotton and linen and woolen cloth, etc.; but in the use of these there are great objections on account of the rapid accumulation of sediment in the numerous pores through which the water percolates, which soon destroys the capillarity of the filter, and although some of these particles can be washed out with difficulty, still in a very short time the filter is rendered totally useless; and again where cotton, linen, or other vegetable matter is employed it will in a short time, particularly when kept in a close vessel, give a disagreeable taste to the water or other liquid. I propose to remedy these difficulties by the following invention, which consists in the employment, for the purpose of a filter, of spun glass which is to be placed over a semi-cylinder in layers and held down and in place by longitudinal strips or bars of either metal or wood.

It also consists in arranging this filter in a box of a peculiar construction, so that the water will be supplied to the filter and from it to a receiver where it is cooled, ready for use: described as follows:—The filter is composed of fine spun glass placed in layers upon the surface of a semi-cylinder, A, and held in place by rods or strips, B. This filter is then set upon a bridge, D, in the filtering compartment, E, with one portion of it in the water to be filtered, and the other hanging over the pure water chamber, F.

G is a large reservoir which contains the unfiltered water. This water is supplied to the filtering chamber, E, by means of a flexible pipe, H, which is kept floating upon the water in reservoir, G, so as to draw off the water from the top and thereby avoid the precipitated sediment. This floating pipe, H, communicates with the filtering chamber at *a*, where I have arranged a floating valve, or ball-valve, J, so that the water in the reservoir, G, may be kept above a level with the water in the chamber, E; and as the water in the chamber, E, subsides the valve, J, will open and allow water to pass in from the reservoir, G; and in this manner the water in the chamber, E, is kept at a constant level.

Below the reservoir and filtering chamber is an ice draw I arranged so that the whole of the water both filtered and unfiltered will be in contact with this ice receptacle: in this manner I keep the water cool.

After long use when the filter has become foul it is only necessary, in order to clean it, to remove it from the chest and pour water over it, when the particles of sediment, slime, animalculæ, and all other impurities will be readily washed away, and the water will again run pure, clear and pellucid as before.

What I claim as my invention, and desire to secure by Letters Patent, is:—

The employment of fine spun glass, arranged in the manner and for the purposes herein set forth, in combination with the reservoir, G, floating valve, J, chamber, E, and pure water chamber, F, essentially in the manner herein represented and described.

EUGÈNE DUCHAMP.

Witnesses:
WM. TUSCH,
R. S. SPENCER.